ULTRAHIGH FREQUENCY TURRET STRIP

Filed Aug. 17, 1951 4 Sheets-Sheet 1

JOHN F. BELL
ARVID E. CHELGREN
JAMES F. WHITE JR
*INVENTORS.*

BY Francis W. Crotty

THEIR ATTORNEY.

JOHN F. BELL
ARVID E. CHELGREN
JAMES F. WHITE JR
*INVENTORS.*

BY Francis W. Crotty

THEIR ATTORNEY.

Jan. 25, 1955 A. E. CHELGREN ET AL 2,700,729

ULTRAHIGH FREQUENCY TURRET STRIP

Filed Aug. 17, 1951 4 Sheets-Sheet 3

JOHN F. BELL
ARVID E. CHELGREN
JAMES F. WHITE JR.
*INVENTORS.*

BY Francis W. Crotty

THEIR ATTORNEY.

Jan. 25, 1955 A. E. CHELGREN ET AL 2,700,729

ULTRAHIGH FREQUENCY TURRET STRIP

Filed Aug. 17, 1951 4 Sheets-Sheet 4

JOHN F. BELL
ARVID E. CHELGREN
JAMES F. WHITE JR.
*INVENTORS.*

BY

THEIR ATTORNEY.

United States Patent Office 2,700,729
Patented Jan. 25, 1955

2,700,729

ULTRAHIGH FREQUENCY TURRET STRIP

Arvid E. Chelgren, Elmhurst, John F. Bell, Glenview, and James F. White, Jr., Chicago, Ill., assignors to Zenith Radio Corporation, a corporation of Illinois Application August 17, 1951, Serial No. 242,364

8 Claims. (Cl. 250—16)

This invention relates to wave-signal receivers and more particularly to a novel tuning strip for operatively conditioning a receiver to intercept signals in a range of ultra-high frequencies. The term "ultra-high frequencies" (U. H. F.) as used herein is intended to designate frequencies in the vicinity of 470 to 890 megacycles per second (mcs.), whereas the term "very-high frequencies" (V. H. F.) denotes frequencies in the 54 to 216 megacycles per second range.

Although the invention is subject to a variety of applications, it is particularly suited for use in a television receiver having a turret-type turning mechanism and for convenience will be described in that connection.

It is expected that the Federal Communications Commission will add to current channel allocations some 70 more television channels in the U. H. F. range. When that is accomplished, there may be available in any receiving locale a number of channels including assignments in both the V. H. F. and U. H. F. ranges.

Over a period of several years, television programs have been transmitted via channels in the V. H. F. band and television receivers including turret-type tuners operable solely in this band have been manufactured to receive such programs. As a result of the extended popularity of commercial television a great number of these receivers have been marketed and are presently in use, but unless suitable provisions are made, they will not be able to receive telecasts over channels in the U. H. F. range.

One proposed solution to this problem is to supply an adapter for each receiver for converting incoming signals of any selected U. H. F. channel to a frequency within the acceptance range of the receiver. Because of its size and space requirements, any such converter would necessarily be located externally of the receiver proper. Obviously, an external adapter is objectionable since it detracts from the styling of the television receiver cabinet. Moreover, such an arrangement requires the user to operate both the receiver itself as well as the adapter for selecting stations in each of the frequency ranges. Still more important, an adapter usually is quite complex and consequently too costly to manufacture as a competitive item. Past experience in analogous situations has proved that converters do not achieve public acceptance and, accordingly, a different approach to the problem is required.

It is a primary object of this invention, therefore, to provide an improved arrangement, not subject to the foregoing objections, for permitting a television receiver designed for the V. H. F. range to operate in the proposed U. H. F. range.

One form of turret tuner presently in use includes a plurality of removable tuning strips, usually one strip being designed for each of the television channels in the V. H. F. range. Since in any receiving locale there are generally less than this entire complement of V. H. F. channels available, it is apparent that some of the V. H. F. strips may be replaced with U. H. F. tuning strips so that by merely operating the channel selector, the receiver may be selectively tuned to any of the V. H. F. or U. H. F. channels providing television service to any given community.

The design and fabrication of U. H. F. tuning strips pose a number of difficult problems which arise from the following circumstances. In the first place, the size of the turret is too small to permit the use of large line-type resonators usually employed for the extreme frequencies involved. In addition, since conventional electron tube amplifiers and frequency converters are not efficient at these frequencies, resort must be had to other expedients for converting a received U. H. F. signal to an intermediate frequency. This must be accomplished while maintaining within acceptable limits the frequency drift, selectivity, sensitivity, noise factor, image rejection, etc., which are the performance factors of the entire receiver. Also, in order to make such tuning strips commercially feasible, they must be inexpensive to construct and market.

Hence, it is an object of the invention to provide a novel tuning strip for conditioning a wave-signal receiver for operation in the U. H. F. range.

Another object of the invention is to provide a novel U. H. F. tuning strip which may be incorporated into the turret tuning mechanism of a wave-signal receiver with a minimum of time and effort.

Yet another object of the invention is to provide a novel U. H. F. tuning strip for a wave-signal receiver which maintains high standards of receiver performance.

A further object of this invention is to provide an improved television receiver which may be selectively tuned by the operation of a single control to any channel of a group of channels included in both the V. H. F. and U. H. F. ranges.

A tuning strip constructed in accordance with the invention may be employed for tuning, to a predetermined signal frequency, a wave-signal receiver having an adjustable stage including contacts for connection to a tuning element. The strip comprises a supporting member including insulating material carrying contacts for engaging the contacts of the adjustable stage. A unitary shield structure is mounted on the supporting member and has cavities defining a plurality of mutually shielded compartments. A corresponding plurality of frequency-determining elements, which conjointly prescribe the frequency-response characteristic of the strip and individually comprise an inductor, are positioned in each of the compartments mechanically supported from said shield structure and coupled to an assigned one of the contacts of the member. At least one conductive and retaining member is fixed to the shield structure and is electrically and mechanically connected to one terminal of each of at least two of the inductors to support those inductors within their respective compartments. The strip has provisions for functionally relating it to the adjustable stage with the contacts of the strip in circuit engagement with the contacts of the stage to tune the stage in accordance with the frequency-response characteristic of the strip.

Another feature of the invention pertains to a frequency-selective signal-translating device especially suited for operation in the U. H. F. range. The device comprises a shield structure having cavities defining a plurality of mutually shielded compartments and a corresponding plurality of frequency-determining elements, which conjointly prescribe the frequency-response characteristic for the device and individually comprise an inductor positioned in each of the compartments, having one terminal electrically coupled to the shield structure. The device further includes a conductive retaining and coupling member, fixed to the shield structure and connected to another terminal of each of the inductors, retaining the inductors within their respective compartments. This member also constitutes a common conductive impedance for electrically coupling the inductors with one another.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings in which:

Figure 4:
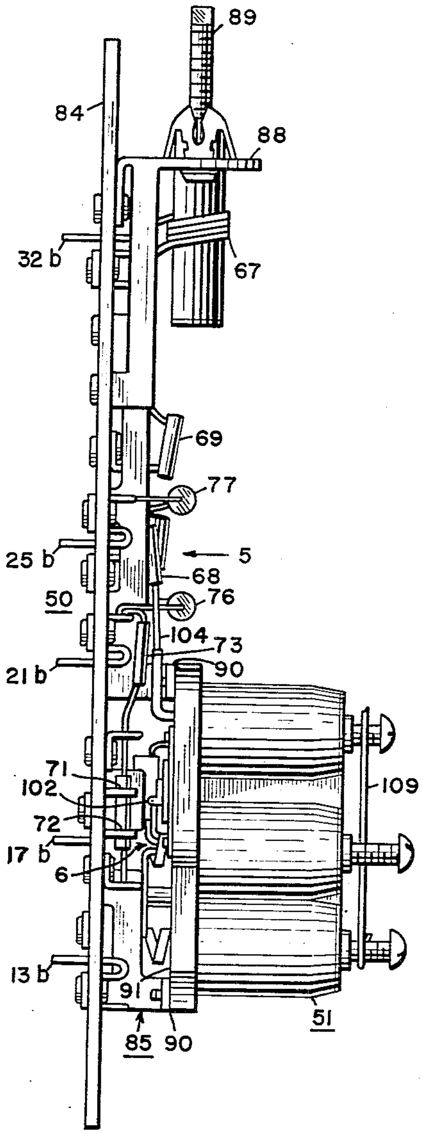
Figure 4 is a view of one side of a tuning strip, the circuit of which is represented in Figure 2.
Figure 5:
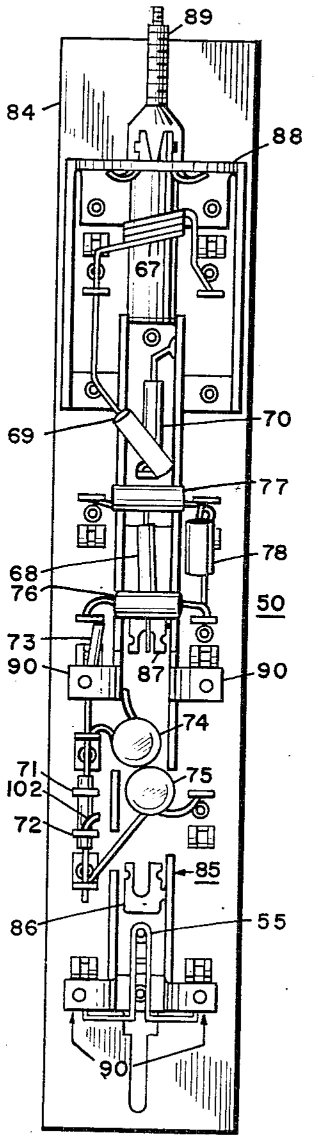
Figure 6:
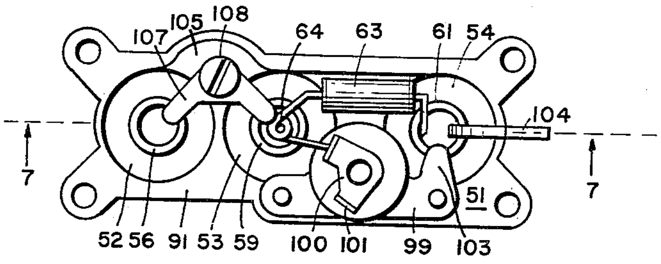
Figure 7:
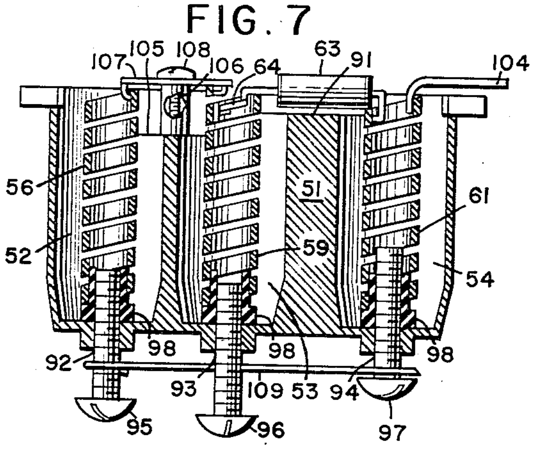

Figures 5 and 6 are views taken in the directions of arrows 5 and 6, respectively, of Figure 4, Figure 6 being drawn to an enlarged scale;

Figure 7 is a cross-sectional view taken along line 7—7 of Figure 6; and

Figure 1:
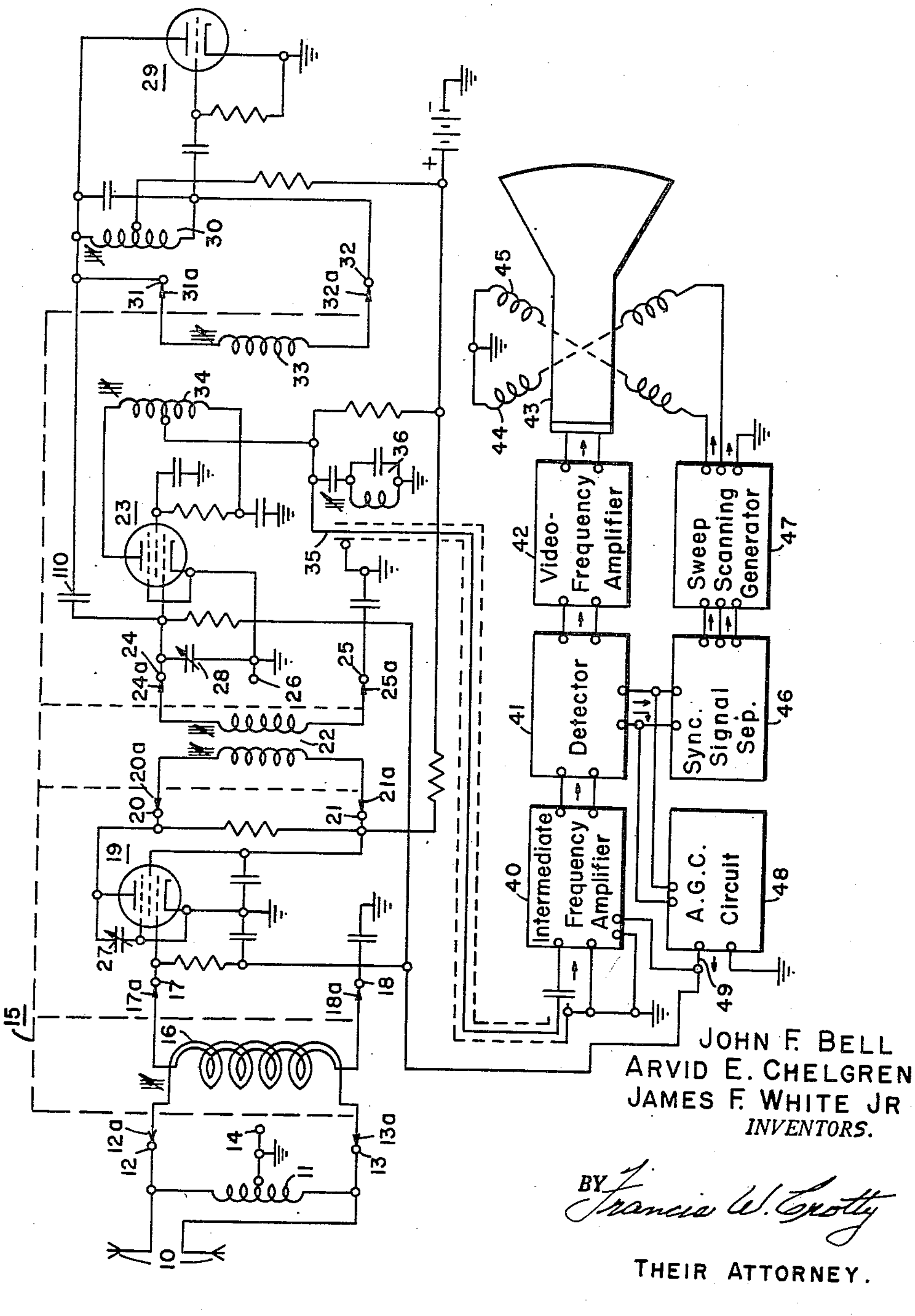
Figure 1 is a schematic diagram, particularly in block form, of a complete television receiver with which a tuning strip in accordance with the present invention may be operatively associated.
Figure 8:
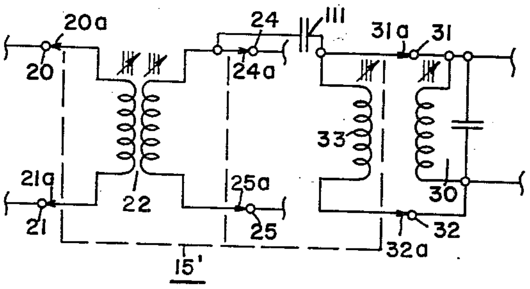

Figure 8 represents a circuit modification of the arrangement of Figure 1.

With reference now to Figure 1, the receiver there illustrated is of the superheterodyne type which may be adjusted to receive the transmitted signal of a selected one of a plurality of television channels. This is accomplished by providing for the channels corresponding tuning strips, only one of which is represented in Figure 1. Each strip carries suitable frequency selectors connected to an array of strip contacts represented by arrows interconnected by dash lines indicating that all these contacts move with strip displacement. The strip contacts are engageable with complementary fixed contacts represented by circles.

An antenna 10 is connected to the ends of a center-tapped balancing coil 11 and to fixed contacts 12 and 13, in circuit engagement with contacts 12*a* and 13*a* of a tuning strip 15. The center-tap of coil 11 is grounded and is connected to a fixed contact 14. The strip contacts are connected to the primary winding of a permeability-tuned input selector 16 mounted on strip 15 and having an interwound secondary connected to strip contacts 17*a* and 18*a* which are in circuit engagement with fixed contacts 17 and 18 of a radio-frequency amplifier 19, employing a conventional pentode circuit.

The anode or output circuit of amplifier 19 is connected to fixed contacts 20 and 21 and strip contacts 20*a* and 21*a*, in circuit engagement with these fixed contacts, are connected to the tunable primary winding of a radio-frequency transformer 22 mounted on strip 15 and having a tunable secondary winding coupled to the input electrodes of an electron-discharge type mixer or frequency converter 23 via contacts 24 and 25 and corresponding strip contacts 24*a* and 25*a*. A grounded fixed contact 26 is associated with stage 23 and is utilized in connection with another tuning strip to be described presently. Variable condensers 27 and 28, in the output circuit of amplifier 19 and in the input circuit of converter 23, respectively, complete selector circuits with the primary and secondary windings of transformer 22.

Also coupled to input electrodes of converter 23 is a local oscillator 29 having an adjustable frequency-determining or tank circuit 30 connected to fixed contacts 31 and 32. Tank circuit 30 is shunted by an adjustable inductor 33 on strip 15 via strip contacts 31*a* and 32*a*. Inductor 33 is designed so that in connection with tank 30, the desired operating frequency for oscillator 29 is achieved.

The anode or output circuit of frequency converter 23 includes a permeability-tuned inductor 34 that is resonated with the output capacitance of the converter to the intermediate frequency of the receiver. An impedance-step-down tap is connected to a coaxial transmission line 35 and is shunted to ground by an adjacent-channel trap circuit 36. Line 35 couples the output circuit of the converter with the input circuit of an intermediate frequency amplifier 40 of one or more stages having the usual selectors for providing a pass-band of frequencies.

Amplifier 40 supplies signals within its pass-band to a detector 41 that is connected in cascade with a video-frequency amplifier 42 of any desired number of stages and a picture tube 43 of the cathode-ray type having line and field-deflection coils 44 and 45. Detector 41 is also coupled to a synchronizing-signal separator 46 having respective output circuits for applying line and frame synchronizing signals to the line and frame sections of a sweep scanning generator 47. Each of the sections of generator 47 develops a signal of saw-tooth wave form for application to coils 44 and 45. Detector 41 is additionally coupled to an automatic gain control circuit 48 which provides, via lead 49, automatic gain control potentials to radio-frequency amplifier 19, converter 23, and intermediate-frequency amplifier 40. Elements 40–48 may be of any suitable conventional construction and the receiver may also include the usual sound channel for reproducing the sound signals which accompany the transmitted picture signals.

In operation, wave signals are intercepted by antenna 10 and applied, balanced-to-ground, to selector 16 which is tuned to the desired television channel. The radio-frequency signal components, representing the desired television signal, are amplified by unit 19 and another frequency selection, further to attenuate undesired frequency components, occurs in transformer 22 before the amplified signal is applied to converter 23. The incoming signal frequency components are heterodyned together with the signal from oscillator 29 and intermediate-frequency signal components are derived in load 34. These components are amplified in unit 40 and the detected signal from detector 41 is applied, after amplification, to the electrode system of picture tube 43 for controlling the intensity of the electron beam within the tube.

At the same time, the line and frame-synchronizing signal components are derived by separator 46 and applied to the respective sections of generator 47. Thus, the beam of tube 43 is deflected to develop a raster in synchronism with the transmitted signal and an image is reproduced on the viewing face of picture tube 43.

The receiver just described is selective to a particular television channel but another channel in the V. H. F. range may be received by replacing tuning strip 15 with another similar strip having suitable tuning elements, corresponding to elements 16, 22 and 33, for the required channel. Hence, the receiver may be conditioned to utilize television signals on any one of the channels in the V. H. F. range. For these frequencies, elements 16, 22 and 33 are conventional coils and stages 19, 23 and 29 operate in the manner described.

Figure 2:
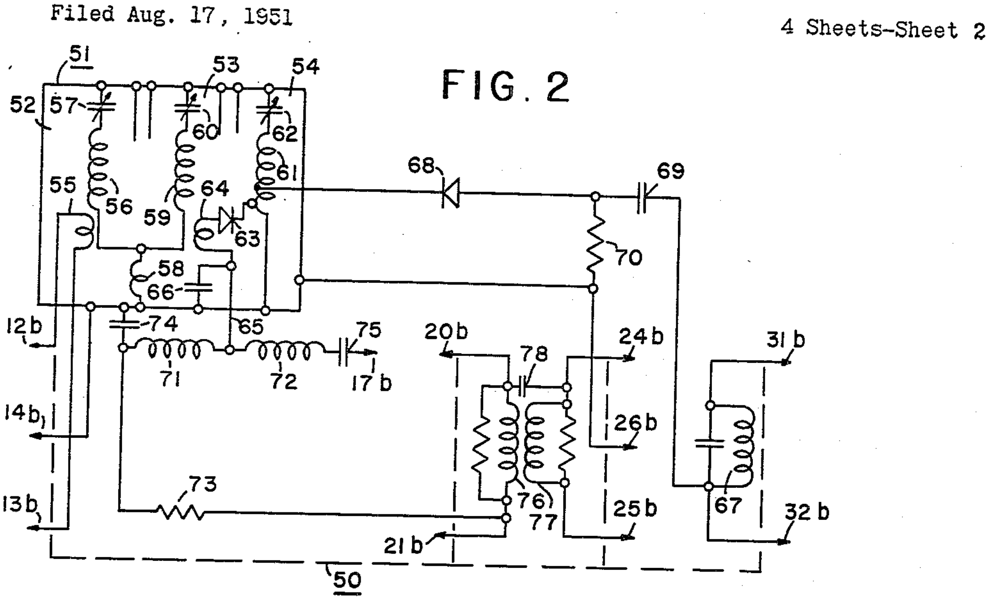
Figure 2 is a schematic circuit diagram of a tuning strip in accordance with the invention.

Radio-frequency amplifier 19, frequency converter 23 and oscillator 29 do not operate efficiently at the extreme frequencies of the U. H. F. channels. Consequently, in operating the receiver for reception over a selected channel in the U. H. F. range, a harmonic of oscillator 29 is combined with the received signal in a second frequency converter and stages 19 and 23 are converted to operate as intermediate-frequency amplifiers. This is accomplished through the use of a U. H. F. tuning strip 50 the circuit arrangement of which is shown in Figure 2. The strip is provided with contacts for engaging the fixed contacts of the receiver. Mating contacts are identified by like reference numerals and those on the strip are followed by the letter "*b*."

The strip comprises a shield housing 51 having three mutually shielded compartments 52, 53 and 54. Contact 14*b* is connected to shield 51 and contacts 12*b* and 13*b* are connected to a coupling loop 55 disposed near the convolutions of a coil 56 disposed within compartment 52. One end of coil 56 is connected to the shield through a variable condenser 57 and its other end is connected to a common inductive coupling impedance 58 that is also in circuit with a coil 59 and a variable condenser 60 housed within compartment 53. Circuits 56–57 and 59–60 are resonant at the frequency of the desired U. H. F. channel.

A harmonic selector including a coil 61 and a variable condenser 62 is contained within compartment 54 and a tap of coil 61 is connected through a frequency converter 63, such as a germanium crystal diode, to one terminal of a pick-up loop 64 disposed in the vicinity of and coupled to coil 59. The other terminal of loop 64 is connected to an intermediate-frequency output lead 65 by-passed to ground for U. H. F. signal voltages by a condenser 66. Obviously other coupling arrangements may be employed.

An adjustable fundamental-frequency determining selector 67 is connected to strip contacts 31*b* and 32*b* and to one terminal of a harmonic generator 68, which may be another germanium crystal diode, through a coupling condenser 69. The other terminal of diode 68 is connected to a tap of coil 61. A current-return resistor 70 is connected between diode 68 and shield 51 and is further connected to strip contact 26*b*. Intermediate-frequency lead 65 is connected to the junction of a pair of inductors 71 and 72, the first of which is connected to strip terminal 21*b* through a resistor 73. This resistor, together with the B-supply voltage available at stationary terminal 21 constitutes a source of constant current bias for diode 63 described in detail in the co-pending application of John F. Bell et al., Serial No.

200,457 filed December 12, 1950, now U. S. Patent No. 2,640,919 issued June 2, 1953, and assigned to the present assignee.

The junction of inductor 71 and resistor 73 is by-passed for signal voltages at the intermediate frequency by a condenser 74. Inductor 71 has such a reactance that together with U. H. F. by-pass condenser 66 there is formed a parallel resonant circuit at the intermediate frequency of the receiver. Inductor 72 is connected to contact **17*b* through a coupling condenser 75 and its value is such that together with the input capacitance of amplifier 19 a series resonant circuit for the intermediate frequency is formed. The strip further includes an anode circuit selector 76 for amplifier 19 connected to contacts 20*b* and 21*b* and an input circuit selector 77 for converter 23 connected to contacts 24*b* and 25*b*. These selectors are tuned with the associated stage interelectrode capacitances to the intermediate-frequency pass-band and are electrically coupled together by a coupling condenser 78**. Individual resistors shunt the selectors to provide the required pass-band characteristic.

In adjusting the receiver of Figure 1 for the reception of U. H. F. signals, tuning strip 15 is removed from circuit engagement with the adjustable and tunable stages of the receiver and strip 50 is operatively positioned with its contacts in circuit engagement with the fixed contacts. Signals are intercepted by antenna 10 and supplied to radio-frequency selector 56—57 by loop 55. The resulting signal currents in coupling impedance 58 are impressed on mixer selector 59—60 so that, before application to frequency converter 63, incoming signals pass through two selectors, thereby materially reducing the response of the receiver to undesired signal frequencies.

Resonant circuit 67, together with tank circuit 30, determines the operating frequency of oscillator 29 at some value which provides a signal suitable for use in effecting heterodyning of the incoming signals to the intermediate frequency of the receiver. More particularly, harmonics of the oscillator signal are developed by crystal 68 and the required one is selected by resonant circuit 61—62 for application to mixer 63.

Intermediate-frequency signal components derived in converter 63 are amplified in stage 19 and are applied to intermediate-frequency selectors 76 and 77 in the output circuit of amplifier 19 and in the input circuit of frequency converter 23. Further intermediate-frequency amplification occurs in stage 23 before the signal components are applied to stage 40 for additional amplification. Thereafter, the receiver performs in the same manner as described in connection with tuning strip 15.

Thus, amplifier 19 and converter 23 are advantageously operated as intermediate-frequency amplifiers in the reception of U. H. F. signals. Moreover, since a harmonic of local oscillator 29 is employed for heterodyning, there is no need for an additional oscillator. As a result, the receiver may be operatively conditioned for a selected one of the U. H. F. channels with a minimum of expense while maintaining high quality performance.

Figure 3:
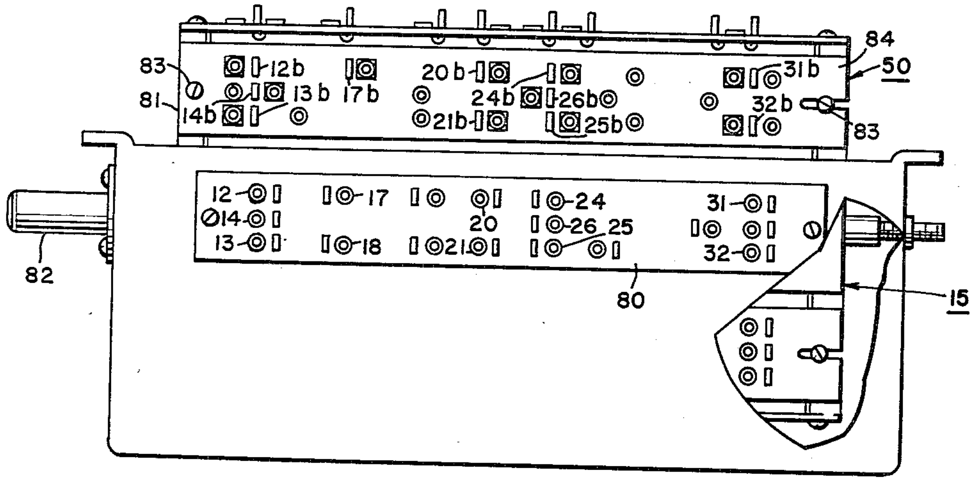
Figure 3 is a view of one side of a turret tuning mechanism including a tuning strip according to the invention.

In order to position a selected tuning strip in functional engagement with the controlled stages of the receiver, a turret mechanism, such as that illustrated in Figure 3, may be employed. It comprises a stationary strip 80 of insulating material which carries the fixed contacts identified in the description of Figure 1. A detent-indexed drum-like member 81 is supported for rotation with a shaft 82 and about its periphery a plurality of tuning strips are removably secured by screws 83. Strip 15 is shown in operative engagement with fixed member 80 and may be replaced by strip 50 in response to rotation of shaft 82. In Figures 3–7, the contacts and circuit elements of strip 50 are identified by the same reference numerals employed in Figure 2.

In order to simplify the drawing, the tubes and other fixed components and amplifier 19, converter 23 and oscillator 29 have not been shown. Usually they are supported on a shelf positioned adjacent strip 80 to facilitate connecting the stationary contacts of that strip into circuit relation with such components.

As best shown in Figure 4, the contacts of strip 50 pass through openings in and extend from one surface of a flat, elongated, support member 84 of insulating material and the several circuit elements are distributed along the other surface. A channel-like, elongated, conductive chassis 85 extends along support 84 with its bight portion riveted at several places to the support. Conductive lugs 86 and 87 shown in Figure 5 extend through aligned openings in the support and in the chassis and electrically connect the chassis with strip contacts **14*b* and 26*b*. Hence, when strip 50 is in its functional position, chassis 85** is grounded.

A bracket-extension 88 at one end of chassis 85 carries inductor 67 and its core (not shown), which is supported for movement with a screw 89. Circuit components exclusive of those within shield 51 are distributed along support 84 and connected to their associated strip contacts. Of these components, harmonic generator 68 is disposed between the sides of chassis 85 and is electrically shielded thereby.

Four lugs 90 extend from the other end of chassis 85 and present a four-point support for shield 51. The shield includes a base portion 91 provided with openings (Figure 6) in alignment with threaded openings in the mounting lugs. Corresponding screws which pass through the base openings are threaded into the lugs to retain shield structure 51 in place. As may be best seen in Figure 7, shield 51 is a unitary casting having cylindrical cavities defining parallel, mutually shielded compartments 52–54. These compartments extend from base 91 and their terminations have threaded openings 92–94 which receive screws 95–97 for axial movement with respect to the compartments.

The compartments enclose respective ones of the coils 56, 59 and 61 in coaxial alignment therewith. Each of these coils is composed of a cylindrical helix of a conductive ribbon, one end of which receives a portion of a hollow, shouldered bushing 98 of electrically insulating material. The head of the bushing abuts the termination end of its compartment and the bushing receives the associated one of screws 95–97.

Since the screws are threaded into structure 51, they are movable into and out of the termination-ends of the coils 56, 59 and 61 and constitute therewith the variable condensers 57, 60 and 62. Each screw thus functions as a movable tuning element and displacement thereof is limited to approximately 30% of the axial length of its coil so that the variation in circuit reactance with tuning element displacement is substantially only one of capacitance. This type of resonant circuit is described in detail in the copending application of Arvid E. Chelgren, Serial No. 146,845 filed February 28, 1950 (now Patent No. 2,595,764 issued May 6, 1952) and assigned to the present assignee.

The wall thickness of the shield between compartments 53 and 54 is selected in view of the physical length of crystal 63 so that the terminal ends of the crystal lie immediately adjacent coils 59 and 61 of these compartments, to which the crystal is to be connected. Also, as shown in Figure 7, at least one side-wall of the shield 51 extends beyond the partition between compartments 53 and 54. This extension of the shield, in connection with the transverse end portion 91 of the partition, provides a seat upon which crystal 63 may rest for support and at the same time be adequately shielded.

Condenser 66 is of the ceramic wafer type and one of its surface terminals is soldered to a flat, conductive plate 99 which is staked to a portion of base 91 opposite mixer 63. A lug 100 is soldered to the other terminal of the condenser and to a lead from loop 64, and an extension 101 of the lug is disposed for connection to the junction 102 of inductors 71 and 72 (Figure 5). An extension 103 of plate 99 overlies compartment 54, being soldered to the base end of coil 61, and a tap of coil 61 is connected to a conductive strap 104 disposed for connection to a lead from harmonic generator 68 (Figure 4).

Turning now to the coupling and supporting means for coils 56 and 59, Figure 7 shows that the partition between compartments 52 and 53 is foreshortened to provide a seat 105 upon which one end of a conductive hollow bushing 106 rests. A conductive lug 107 is disposed at the other end of the bushing and has portions overlying each of the compartments 52 and 53. A screw 108, which passes through an opening in lug 104 aligned with the opening of the bushing, is threaded into seat 105 of shield 51 to secure the lug and the bushing within the shield structure and providing electrical connection therebetween. The portions of lug 107 which overlie compartments 52 and 53 are soldered to the base ends of coils 56 and 59, and hence bushing 106 and screw 108 together constitute a conductive member in circuit with each of the coils. This member is the common coupling impedance represented by coil 58 of Figure 2. The side wall of housing 51 which shields crystal 63 also extends beyond the partition between compartments 52 and 53 effectively to shield the coupling impedance.

Coils 56, 59 and 61, prior to incorporation within unit 51, have an axial length that is slightly greater than the distance from the shoulder of the associated one of the bushings 98 to the extensions of lug 107 and extension 103 of plate 99, which overlie their compartments. Thus, after assembly the coils are under a slight compression and are maintained in fixed mechanical relationship within their compartments. A length of spring wire 109 is interleaved with screws 95–97, externally of the shield 51. It has a resiliency sufficient to bias each of the screws sidewise in its threaded opening for maintaining a good electrical connection and for preventing inadvertent movement of the screws.

In operation, with selected inductance values for the coils 56, 59 and 61, the positions of the screws 95–97 are adjusted to provide the desired frequency-response characteristic for strip 50 as described in connection with Figure 2.

It has been determined that the entire U. H. F. band may be covered in three sections by three slightly different versions of unit 51. Specifically, one of these includes coils 56, 59 and 61 of a selected number of turns and bushing 106 of a given diameter so that the unit is adjustable for any channel in the high frequency section of the U. H. F. band by means of screws 95–97. To accommodate the next lower frequency section of the band, coils 56, 59 and 61 are made up of a greater number of turns and bushing 106 is of smaller diameter. Such a smaller bushing effects an increased inductance value for coupling impedance 58 in accordance with the increased inductance of coils 56 and 59 in order that the band-selection characteristic of selectors 56—57, and 59—60 may have essentially the same absolute value for any section of the U. H. F. band. In designing the remaining unit, for the lowest section of the U. H. F. range, coils 56, 59 and 61 have a still greater number of turns and bushing 106 is further reduced in diameter.

From an inspection of Figures 4–7 it is apparent that unit 51 is extremely compact and accordingly strip 50 is of a very small size. Hence, the tuning strip in accordance with the invention is entirely suitable for use in the restricted space allotment of a turret type tuner. Moreover, each of the resonant circuits contained within unit 51 has an effective circuit Q which approaches that of the line-type resonators, and hence, the performance figure for the receiver is not adversely affected, even though a tuning strip of such a small size is employed.

As may be seen in Figure 3, any of the tuning strips may be removed from carriage 81 of the turret, there illustrated, simply by removing screws 83, and may be quickly and easily replaced. Thus, by replacing some of the V. H. F. tuning strips with strips such as 50 for specified U. H. F. channels, a receiver incorporating the turret may be quickly conditioned so that any of a group of V. H. F. and U. H. F. channels may be selected by operation of shaft 82.

With reference once again to Figures 1 and 2, it may be seen that although a harmonic of local oscillator 29 is employed for heterodyning received signals when strip 50 is operatively positioned, the fundamental signal component of the oscillator is applied to converter 23 (operating as an intermediate frequency amplifier) via a coupling condenser 110. Since the fundamental frequency of the oscillator is widely different from the intermediate frequency of the receiver, no detrimental results are experienced from this connection.

However, should it be desirable to remove the fundamental component of oscillator 29 from converter 23 during reception of U. H. F. signals, the circuit of Figure 8 may be employed, in which condenser 110 is omitted. Figure 8 represents a modified form of V. H. F. strip 15 having a coupling condenser 111 connected between contacts 24a and 31a. Each of the V. H. F. strips may be similarly equipped in order to provide a coupling circuit from oscillator 29 to converter 23 only when one of those strips is operatively positioned. It is possible to avoid the use of a plurality of coupling condensers for the several strips by connecting condenser 110 (Figure 1) to an unused fixed contact of member 80 and providing a connection from the corresponding V. H. F. strip contact to contact 24a.

While particular embodiments of the present invention have been shown and described, it will be obvious to those skilled in the art that changes and modifications may be made therein, and, therefore, the aim in the appended claims is to cover all such changes and modifications as fall within the true spirit and scope of the invention.

We claim:

1. A tuning strip for tuning to a predetermined signal frequency a wave-signal receiver having an adjustable stage including contacts for connection with a tuning element, comprising: a supporting member including insulating material and having contacts for engaging said contacts of said adjustable stage; a unitary shield structure mounted on said member having cavities defining a plurality of mutually shielded compartments; a corresponding plurality of frequency-determining elements conjointly prescribing the frequency-response characteristic of said strip and individually comprising an inductor positioned in each of said compartments, mechanically supported from said shield structure, and coupled to an assigned one of said contacts of said member; at least one conductive retaining and coupling member fixed to said shield structure and electrically and mechanically connected to one terminal of each of at least two of said inductors to support said inductors within their respective compartments; and said strip having provisions for functionally relating said strip to said adjustable stage with the contacts of said strip in circuit engagement with the contacts of said stage to tune said stage in accordance with said frequency-response characteristics of said strip.

2. A frequency-selective signal-translating device comprising: a shield structure having cavities defining a plurality of mutually shielded compartments; a corresponding plurality of frequency-determining elements conjointly prescribing the frequency-response characteristic for said device and individually comprising an inductor, positioned in each of said compartments, having one terminal electrically coupled to said shield structure; and a conductive retaining and coupling member, fixed to said shield structure and connected to another terminal of each of said inductors to retain said inductors within their respective compartments and to constitute a common conductive impedance for electrically coupling said inductors with one another.

3. A frequency-selective signal-translating device comprising: a shield structure having cavities defining two mutually shielded compartments and including a wall between said cavities foreshortened to form a seat; two frequency-determining elements conjointly prescribing the frequency-response characteristic for said device and individually comprising an inductor, positioned in each of said compartments, having one terminal electrically coupled to said shield structure; and a retaining member mechanically connected to said seat of said shield structure in mechanical and electrical connection with the other terminals of said inductors to support said inductors mechanically while providing an electrical coupling there between.

4. A frequency-selective signal-translating device comprising: a shield structure having cavities defining three mutually shielded compartments; three frequency-determining elements conjointly prescribing the frequency-response characteristic for said device and individually comprising an inductor, positioned in each of said compartments, at least two of said inductors having one terminal electrically coupled to said shield structure; a retaining member included within said shield in mechanical and electrical connection with the other terminals of said two inductors to support said inductors mechanically while providing an electrical coupling there between; and a uni-directionally conductive element, at least partially disposed within and mechanically supported by said shield structure, coupled between the remaining one of said three inductors and one of the aforesaid two inductors.

5. A frequency-selective signal-translating device comprising: a shield structure having cavities defining three mutually shielded compartments and including a wall between a pair of said compartments foreshortened to form a first seat and a second seat disposed between the third of said compartments and one of said pair of compartments; three frequency-determining elements conjointly prescribing the frequency-response characteristic for said device and individually comprising an inductor, positioned in each of said compartments, the two of said inductors positioned in said pair of compartments having one terminal electrically coupled to said shield structure; a retaining member mechanically connected to said first seat and in mechanical and electrical connection with the other terminals of said two inductors to support said inductors mechanically while providing an electrical coupling there between; and a uni-directionally conductive element disposed at said second seat and coupled between the remaining one of said three inductors and one of the aforesaid two inductors.

6. A frequency-selective signal-translating device comprising: a shield structure having a base portion and cavities extending transversely of said base portion and adjacent one another to define at least two mutually shielded compartments; at least two frequency-determining elements conjointly prescribing the frequency-response characteristic for said device and individually comprising an inductor, positioned in each of said compartments, having one terminal electrically coupled to said shield structure; and a retaining member extending from said base portion of said shield structure in the vicinity of said cavities and having a conductive extension overlying at least a portion of each of said cavities in mechanical and electrical connection with the other terminals of said inductors to support said inductors while providing an electrical coupling there between.

7. A unitary frequency converter for a tuning strip of a turret tuner comprising: a shield structure to be mounted on said strip and having cavities defining a plurality of mutually shielded compartments; an adjustable input signal selector mechanically secured in one of said compartments; an adjustable heterodyne signal selector mechanically secured in another of said compartments; an individual adjusting device supported by said structure for movement with respect to each of said compartments for tuning said selectors; and a frequency-converting device at least partially enclosed within said structure, shielded by and mechanically supported from said structure and coupled between said selectors.

8. A tuning strip for tuning to a predetermined signal frequency a wave-signal receiver having an adjustable stage including contacts for connection with a tuning element, said strip comprising: a support member including insulating material having contacts for engaging said contacts of said adjustable stage; an electrically conductive chassis mounted to said support member and having such configuration as to present a concavity; a unitary shield structure removably secured to said chassis and having a plurality of mutually shielded compartments; an input signal selector positioned in one of said compartments; a heterodyne signal selector positioned in another of said compartments; a frequency-converting device at least partially enclosed within said structure, shielded by and mechanically supported from said shield structure and electrically coupled between said selectors; and a frequency-multiplying device positioned within said concavity of said chassis and electrically coupled to said heterodyne signal selector.

References Cited in the file of this patent

UNITED STATES PATENTS

| | | |
|---|---|---|
| 1,816,718 | Bond | July 28, 1931 |
| 2,000,677 | Trevor | May 8, 1935 |
| 2,078,909 | Gunther | Apr. 27, 1937 |
| 2,430,886 | Peterson | Nov. 18, 1947 |
| 2,503,100 | Dewhurst | Apr. 4, 1950 |
| 2,560,320 | Winkler | July 10, 1951 |
| 2,596,117 | Bell et al. | May 13, 1952 |
| 2,611,807 | Lazzery | Sept. 23, 1952 |